(No Model.)

J. THOMSON.
DIFFERENTIAL GEARING.

No. 507,695. Patented Oct. 31, 1893.

Witnesses
Jno. G. Hinkel
A. N. Dobson

Inventor
John Thomson
By Foster Freeman
Attorneys

UNITED STATES PATENT OFFICE.

JOHN THOMSON, OF BROOKLYN, NEW YORK, ASSIGNOR TO THE THOMSON HYDRAULIC COMPANY, OF NEWARK, NEW JERSEY.

DIFFERENTIAL GEARING.

SPECIFICATION forming part of Letters Patent No. 507,695, dated October 31, 1893.

Application filed January 7, 1893. Serial No. 457,678. (No model.)

*To all whom it may concern:*

Be it known that I, JOHN THOMSON, a citizen of the United States, and a resident of Brooklyn, Kings county, New York, have invented certain new and useful Improvements in Differential Gearings, of which the following is a specification.

My invention relates to differential gearing and it has for its object to improve the construction and arrangement of such devices, so that while they are simple and cheap, they are accurate and easy of operation and the special object of the invention is to so arrange and construct the parts that the free member of the differential gearing train can be driven in such a manner as to avoid all side thrust upon the bearing, and further to remedy the cramping tendency commonly inherent to such devices, especially when operated with a single driving pinion engaging a pair of differential gears, and to these ends my invention embodies the features of construction and arrangement and having the mode of operation substantially as hereinafter more particularly pointed out.

Figure 1:
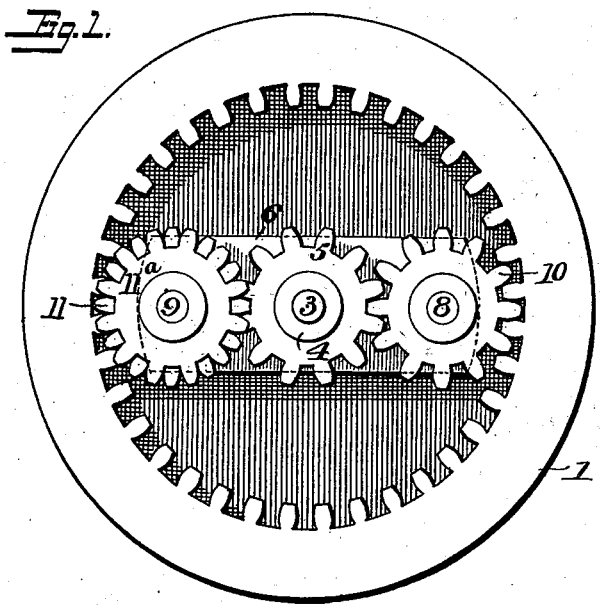
Figure 2:
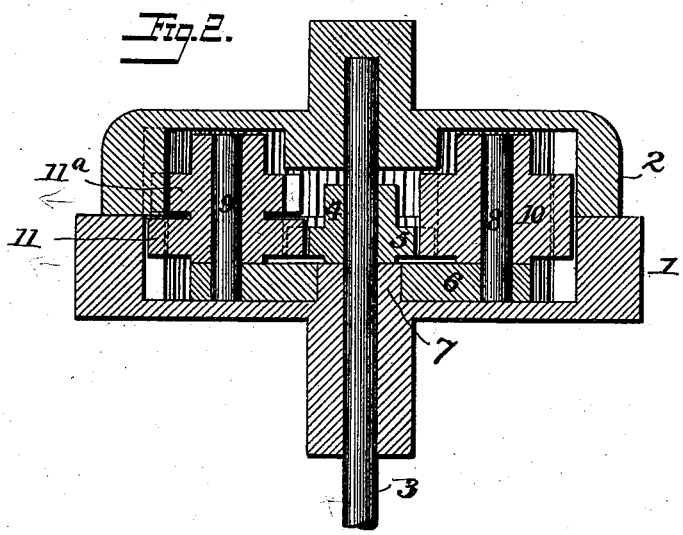
Figure 3:
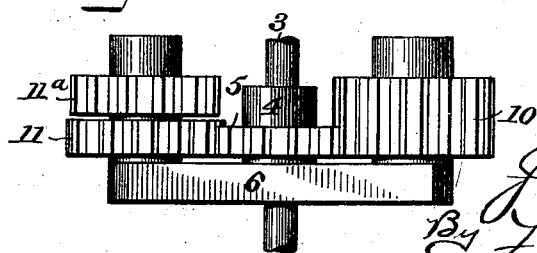

Referring to the accompanying drawings, Figure 1, is a plan view showing one of the gear wheels and the pinions therein, the upper gear wheel being removed. Fig. 2, is a vertical cross section through the gear wheels and pinions, and Fig. 3, is a side elevation of the pinions and carrying arm detached.

As above indicated, one of the essential objects of the invention, is to so arrange the device that the free member of the internal differential gear train shall be driven from two or more sides, preferably at diametrically opposite parts, so that all side thrust from the bearing is avoided and the tendency to cramp is overcome, and I have shown my invention in the preferred embodiment which I will now describe.

A gear wheel 1, is shown as provided with an internal gear having a certain definite number of teeth. Arranged in juxtaposition to said gear wheel 1, is another gear wheel 2, also having a series of internal teeth, but of a different number from that of the first gear wheel, there preferably being one, more or less, than the first gear wheel. This is clearly shown in the position of the teeth in Fig. 2. These two internal gear wheels are suitably arranged so as to operate together, but to be free to turn independently of each other and in the present instance I have shown a shaft or spindle 3, passing through a suitable bearing on the gear wheel 1, and entering a bearing on the gear wheel 2, these bearings being preferably elongated to permit the gears to run freely, and at the same time true, with relation to each other. Mounted on the shaft or spindle 3, and secured thereto is a central driving pinion 5, which is preferably provided with an elongated bearing or hub 4.

Mounted within one of the internal gear wheels is an arm or support 6, and this is fitted, in the present instance, to revolve freely on a bearing 7. This support is provided with a number of studs or spindles, there being two shown in the present instance, numbered respectively 8 and 9. Loosely mounted on one of these studs, as 8, is a pinion 10 having long leaves or teeth arranged to engage the teeth of the driving pinion 5, on the one side, and on the other to engage the teeth of both of the internal gears 1 and 2. Mounted upon the other stud, as 9, is the double or compound pinion 11, this being formed practically in two parts, but made fast so as to act as one piece. The teeth on the two parts 11 and $11^a$, of the pinion, are arranged so that the teeth of one are directly opposite the spaces in the other and in this arrangement the teeth of one portion of the pinion as $11^a$, will engage the teeth of the differential gears on the side diametrically opposite from the engagement of the teeth of the pinion 10, so that all tendency to cramp and all side thrust of the gears are avoided. Furthermore the center driving pinion 5, is arranged to engage the teeth of the pinion 10 and the teeth of the pinion 11, and it will be seen that all of the moving strain upon the pivots are counterbalanced by corresponding resistances. Substantially the same result may also be accomplished by having more than two pinions, except of course that the relative position of the teeth would be varied, and instead of being arranged off the pitch to the extent of one-half, the pitch, would be required to be equally divided between the various pinions according to their number, and it is for this reason that I prefer the present arrangement with the two pinions mounted on the arm. It will be seen that from this arrangement all the parts are simple of construction, can be easily and accurately made and fitted together, and when the device is operated the tendency to cramp is overcome and the side thrust is avoided.

What I claim is—

1. A differential gearing comprising two interior gear wheels having a variable number of teeth, a central driving pinion, a support, a simple pinion carried by the support and engaging the central driving pinion and both the central gear wheels and a compound pinion carried by the support and having two sets of teeth, one set engaging the driving pinion and one wheel and the other set engaging the other gear wheel substantially as described.

2. A differential gearing, comprising two internal gear wheels having a variable number of teeth, a central driving pinion, a support loosely mounted on one of the gear wheels, a pinion carried by the support and having long teeth engaging the driving pinion, and both the internal gear wheels and the compound pinion carried by the support and having two sets of teeth engaging the respective gear wheels, the teeth of one set being arranged out of line with the teeth of the other set; substantially as described.

In testimony whereof I have signed my name to this specification in the presence of two subscribing witnesses.

JOHN THOMSON.

Witnesses:
JOHN McKINNON,
MEYER KRASNER.